United States Patent [19]
Chia et al.

[11] Patent Number: 5,511,695
[45] Date of Patent: Apr. 30, 1996

[54] PAINT COLORANT DISPENSER

[75] Inventors: Julian-Y.-P. Chia, Ladner; Gary B. Jenne, New Westminster, both of Canada

[73] Assignee: Hero Industries, Inc., Burnaby, Canada

[21] Appl. No.: 259,330

[22] Filed: Jun. 13, 1994

[51] Int. Cl.$^6$ ............................................ B67D 5/22
[52] U.S. Cl. ..................... 222/43; 222/283; 222/309
[58] Field of Search ............................. 222/43, 282, 283, 222/309, 380

[56] References Cited

U.S. PATENT DOCUMENTS

| | | | |
|---|---|---|---|
| 3,275,042 | 9/1966 | Strazdins | 141/27 |
| 3,601,845 | 8/1971 | Mavrich | 222/309 |
| 3,802,608 | 4/1974 | Gullett | 222/309 |
| 3,805,998 | 4/1974 | Croslin | 222/309 |
| 4,027,785 | 6/1977 | Edstrom et al. | 222/309 |
| 4,273,257 | 6/1981 | Smith et al. | 222/309 |
| 4,293,010 | 10/1981 | Winiasz | 222/309 |
| 4,456,152 | 6/1984 | Young et al. | 222/309 |
| 4,526,294 | 7/1985 | Hirschmann et al. | 222/309 |
| 4,781,312 | 11/1988 | Strazdins | 222/309 |
| 4,801,051 | 1/1989 | Lewis et al. | 222/309 |
| 4,964,534 | 10/1990 | Strazdins | 222/309 |
| 4,966,308 | 10/1990 | Strazdins | 222/309 |

FOREIGN PATENT DOCUMENTS

| | | | |
|---|---|---|---|
| 2702539 | 8/1977 | Germany | 222/309 |

*Primary Examiner*—Andres Kashnikow
*Assistant Examiner*—Philippe Derakshani
*Attorney, Agent, or Firm*—Oyen Wiggs Green & Mutala

[57] ABSTRACT

The dispenser provides for accurate and easily repeatable dispensation of selected volumes of paint colorant. The dispenser has an adjustable stop for limiting the travel of a piston in a paint colorant metering pump. The stop position can be adjusted in equally spaced increments by a coarse adjustment which includes a pin which may be engaged in equally spaced holes in a stop support member. The stop position can be adjusted to intermediate positions by a fine adjustment. The fine adjustment includes a threaded stop member mounted in a threaded aperture. The pitch of the threads on the stop member is such that the stop moves a distance of one increment in a single rotation of the stop member. The stop member may be turned by a knob. The knob is slidably mounted so that it does not move axially with the stop member and has a limited rotation so that each position of the knob corresponds to only one stop position.

20 Claims, 4 Drawing Sheets

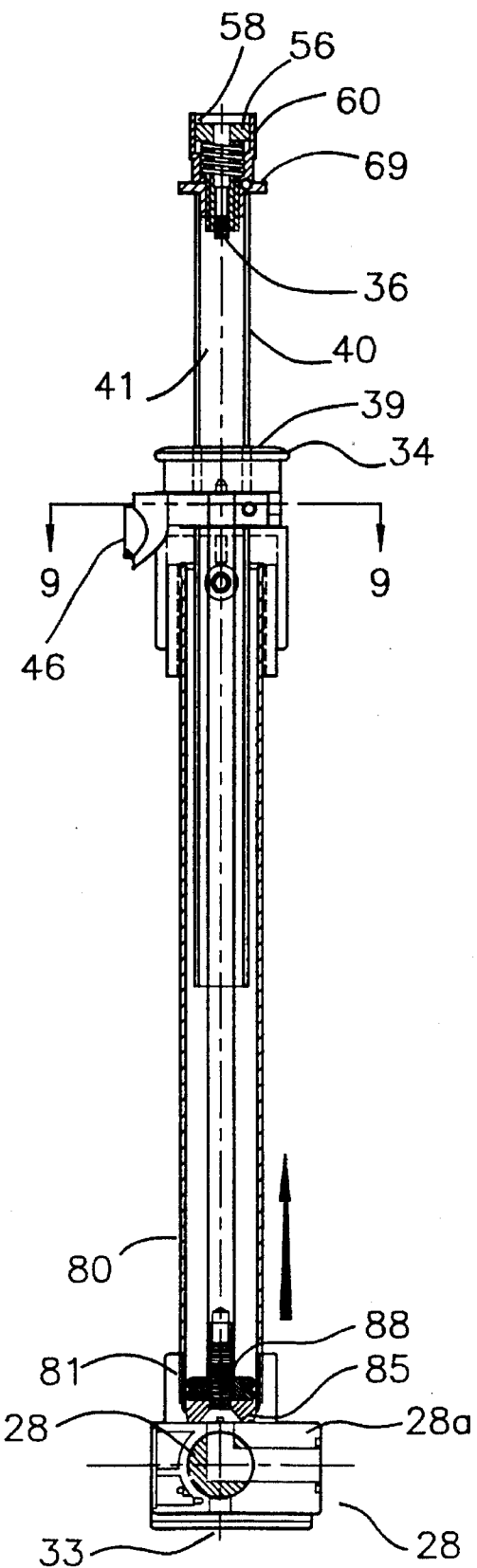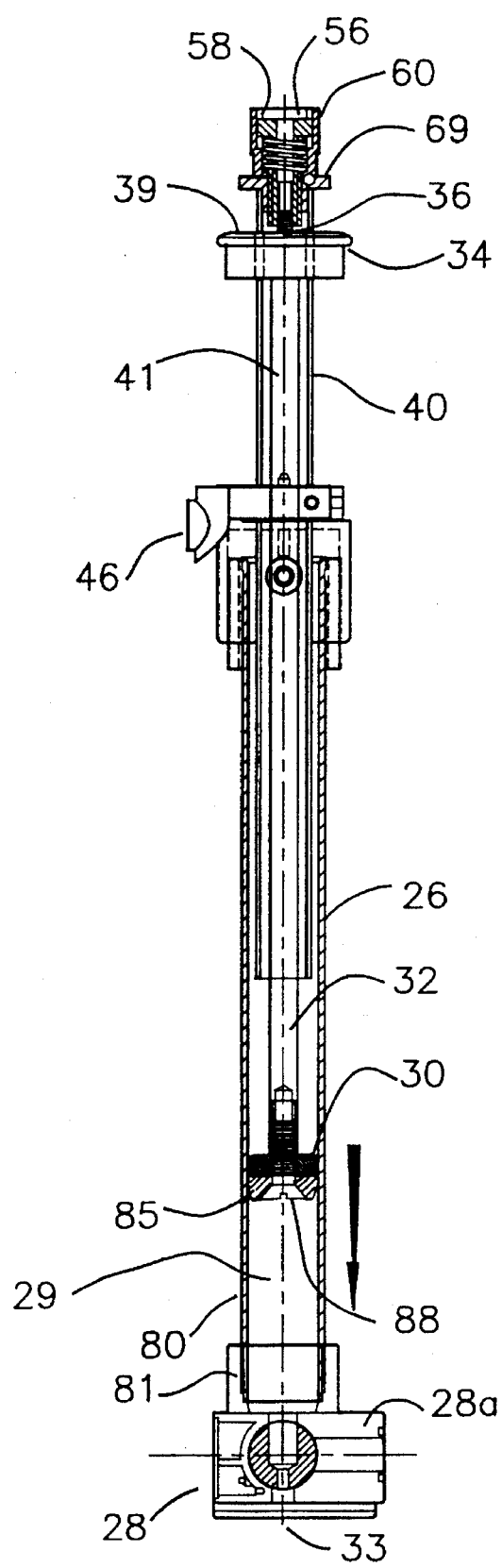

5,511,695

PAINT COLORANT DISPENSER

FIELD OF THE INVENTION

This invention relates to an apparatus for dispensing accurately metered quantities of paint colorant for tinting paint.

BACKGROUND OF THE INVENTION

Paint of virtually any color can be custom made by beginning with a white base and adding precisely measured amounts of paint colorant of different colors. Sometimes to achieve a desired color it is necessary to dispense very small amounts of paint colorant.

It is important that a paint colorant dispenser have a quick, simple, easily repeatable operation. It is often necessary to prepare many small batches of paint of different colors. If the dispensing operation is not quick and simple then time is wasted and the likelihood of errors increases.

The color of paint can be greatly affected by small variations in the amount of colorant added. Consequently, a paint colorant dispenser must provide precise, repeatable settings.

Prior art paint colorant dispensers typically comprise a reservoir for storing paint colorant and a pump comprising a piston movable within a cylinder and a valve for placing the interior of the cylinder in fluid communication with either a paint colorant reservoir or an outlet. As the piston is raised, paint colorant is drawn into the cylinder through the valve. The valve is then switched to connect the cylinder to the outlet. As the piston is lowered, the paint colorant in the cylinder is expelled through the outlet. The amount of paint colorant dispensed is determined by the stroke of the piston and the bore of the cylinder.

Prior art paint colorant dispensers typically include a stop, adjustable in discrete increments, to limit the travel of the piston. An operator can dispense a selected amount of colorant by fixing the stop in a desired position, raising the piston to the stop, and then lowering the piston.

A difficulty with such paint colorant dispensers is that the stop can be fixed only in discrete positions. If the desired amount of paint colorant is between stop positions then the operator is forced to approximate the desired amount by lifting the piston to a position between stop positions. This method leads to unacceptable errors in the amount of colorant dispensed, especially if the piston is relatively large in diameter.

A previous paint colorant dispenser disclosed in U. S. Pat. No. 4,96.4,534 has two pistons, a small bore piston for dispensing small amounts of colorant, and a larger bore piston for dispensing larger amounts of colorant. Such twin pump dispensers have the disadvantage that the operator may need to manipulate two pistons to dispense a desired amount of colorant. This introduces extra steps into the dispensing process and increases the likelihood of errors. A further disadvantage is that such dispensers have many parts and seals which can lead to increased maintenance costs and reduced reliability.

Some prior art paint colorant dispensers approach the problem of accurately dispensing small amounts of paint colorant by requiring the user to replace a gauge rod in the stop assembly with a separate gauge rod. The separate gauge rod allows the stop to be fixed in a position in which only a small volume of colorant (for example $1/256$ fluid ounces) is dispensed. A problem with this approach is that the dispenser should be separately calibrated for use with the separate gauge rod. This increases manufacturing costs. Furthermore, the separate gauge rod is easily lost and installing the separate gauge rod introduces extra steps to the dispensing process.

SUMMARY OF THE INVENTION

The invention provides a paint colorant dispenser which includes apparatus for adjusting the position of a stop for regulating the volume of paint colorant dispensed by the paint colorant dispenser. The paint colorant dispenser comprising a piston sealingly and slidably mounted in a cylinder having first and second ends and an axis and a stop contacting member on the piston. The apparatus comprises: a) a stop member comprising a central threaded portion, and a first end having a stop surface, the stop surface being axially aligned with the stop contacting member; b) a stop support member having a mounting portion at one end, the stop support member being slidably mounted with respect to the cylinder. The stop member passing through a threaded aperture in the mounting portion, with threads of the stop member engaged with threads of the aperture; c) coarse adjustment means associated with the stop support member for fixing the mounting portion in one of a plurality of positions equally spaced apart by a distance L along a line parallel to the axis of the cylinder; and d) a knob associated with the stop member for rotating the stop member in the aperture. The threads have a pitch such that in one rotation of the stop member, the stop surface moves by a distance of at least L along the line.

In a preferred embodiment the invention provides a paint colorant dispenser comprising: a cylinder comprising a tube and a valve body closing a lower end of the tube; a valve in the valve body, the valve having a first position wherein the cylinder is in fluid communication with a reservoir and a second position wherein the cylinder is in fluid communication with an outlet; a piston slidably and sealingly mounted within the cylinder; a piston rod connected to the piston, the piston rod comprising a stop contacting surface; a stop support member slidably mounted with respect to the cylinder; coarse stop adjustment means for temporarily fixing the stop support member in one of a plurality of positions equally spaced apart by a distance L; and fine adjustment means mounted to the stop support member. The fine adjustment means comprises: a stop mounting plate on the stop support member, the stop mounting plate comprising a threaded aperture axially aligned with stop contacting surface; a stop member comprising a central threaded portion engaged in the threaded aperture, and a lower stop surface; a knob on the stop member for turning the stop member in the aperture; and means for restricting rotation of the stop member and the knob to an angular range, the angular range being no more than one full rotation. The coarse stop adjustment means comprises: a plurality of indentations in the stop support member; a sliding pin selectively engageable in one of the indentations; a spring for urging the sliding pin into one of the indentations; and, a linkage associated with the sliding pin for selectively retracting the sliding pin. The threads on the stop member have a pitch such that in rotating the stop member through the angular range the stop surface moves by a distance of at least L along a line parallel to the axis.

BRIEF DESCRIPTION OF THE DRAWINGS

In drawings which illustrate specific embodiments of the invention, but which should not be construed as restricting the spirit or scope of the invention in any way:

FIG. 6 is a section through the pump assembly from the paint colorant dispenser of FIG. 1 with its piston in a lowered position;

FIG. 7 is a section through the pump assembly from the paint colorant dispenser of FIG. 1 with its piston in a raised position;

DETAILED DESCRIPTION OF THE PREFERRED EMBODIMENT

Figure 1:
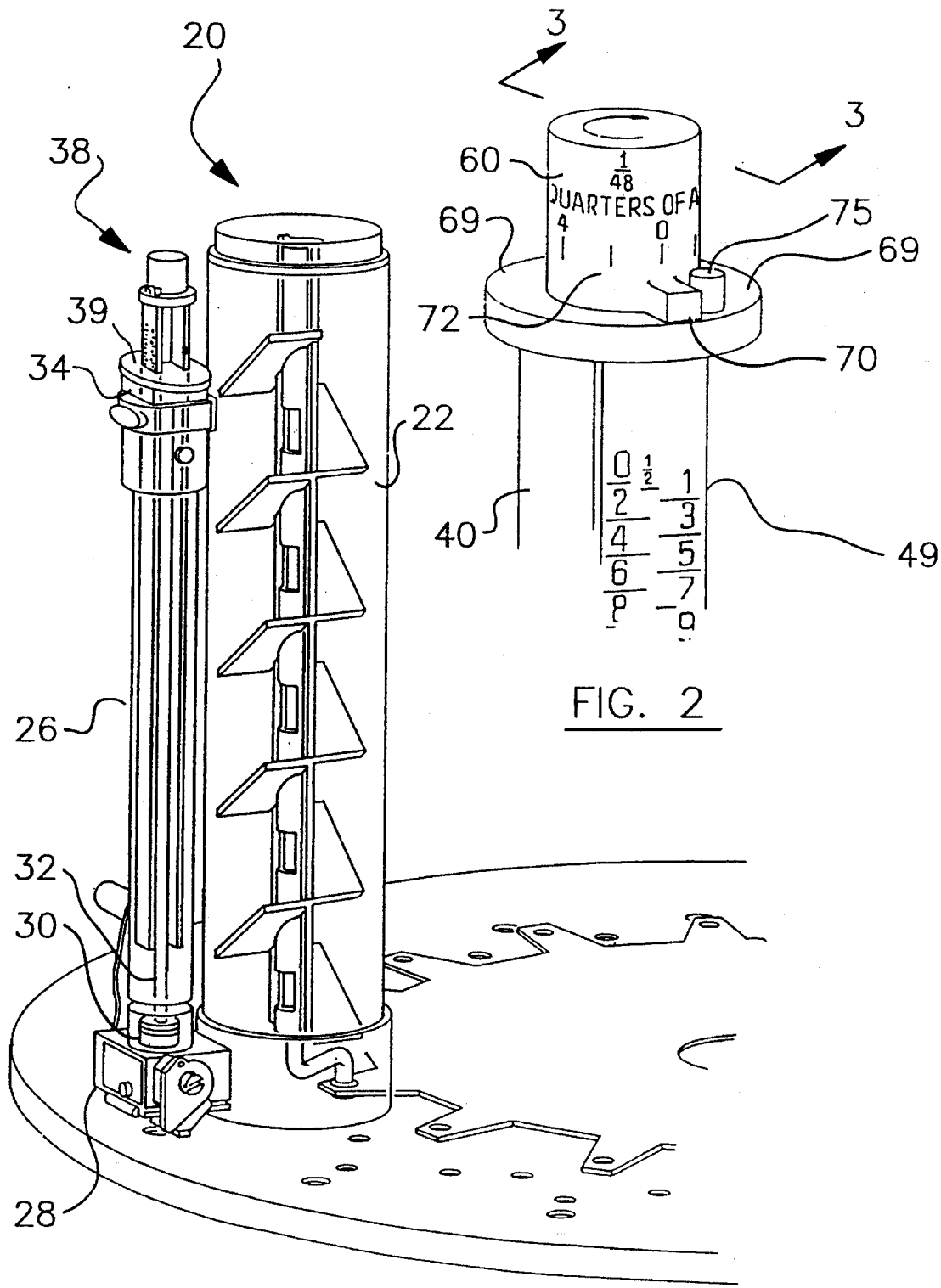
FIG. 1 is a partially cut-away perspective view of a paint colorant dispenser according to the invention.

As shown in FIG. 1, a paint colorant dispenser 20 incorporating the invention comprises a paint colorant reservoir 22 coupled to a measuring cylinder 26 through a valve 28. A piston 30 is slidably and sealingly mounted inside measuring cylinder 26 at a lower end of a piston rod 32. Piston 30 and valve 28 define a variable volume 29 (FIG. 7) inside measuring cylinder 26.

The upper end of piston rod 32 is attached to a plunger handle 34. By grasping plunger handle 34 and moving it vertically a user can move piston 30 within cylinder 26 to vary variable volume 29.

To operate paint colorant dispenser 20 valve 28 is turned so that reservoir 22 is in fluid communication with measuring cylinder 26 (FIG. 6). Then piston 30 is raised within measuring cylinder 26. As piston 30 is raised, paint colorant is drawn from reservoir 22, through valve 28 into volume 29 in measuring cylinder 26. The volume of paint colorant drawn into measuring cylinder 26 depends upon the diameter of measuring cylinder 26 and the stroke of piston 30.

Valve 28 is then turned so that measuring cylinder 26 is in fluid communication with a nozzle 33 (FIG. 7). When piston 30 is subsequently lowered the paint colorant filling the volume between piston 30 and the lower end of measuring cylinder 26 is expelled through nozzle 33.

The travel of piston 30 is limited by stop assembly 38. A user can lift plunger handle 34 only until upper surface 39 of plunger handle 34 hits a stop 36 on a stop assembly 38. The stroke of piston 30, and, therefore, the quantity of paint colorant dispensed in a single stroke of piston 30, can be adjusted by moving stop 36 up or down.

As shown in FIGS. 1 and 6, stop 36 is mounted at the top end of a stop support member 40. Many configurations for stop support member 40 are possible. It is convenient to make stop support member 40 a rigid channel member having a longitudinal channel 41. Support member 40 is slidably affixed relative to cylinder 26. Support member 40 may be fixed at discrete positions relative to cylinder 26 by means of a coarse adjustment mechanism comprising spring loaded pins 44a, 44b which engage in holes 45 (or other pin-engaging indentations) on a rear face of support member 40.

Figure 9:
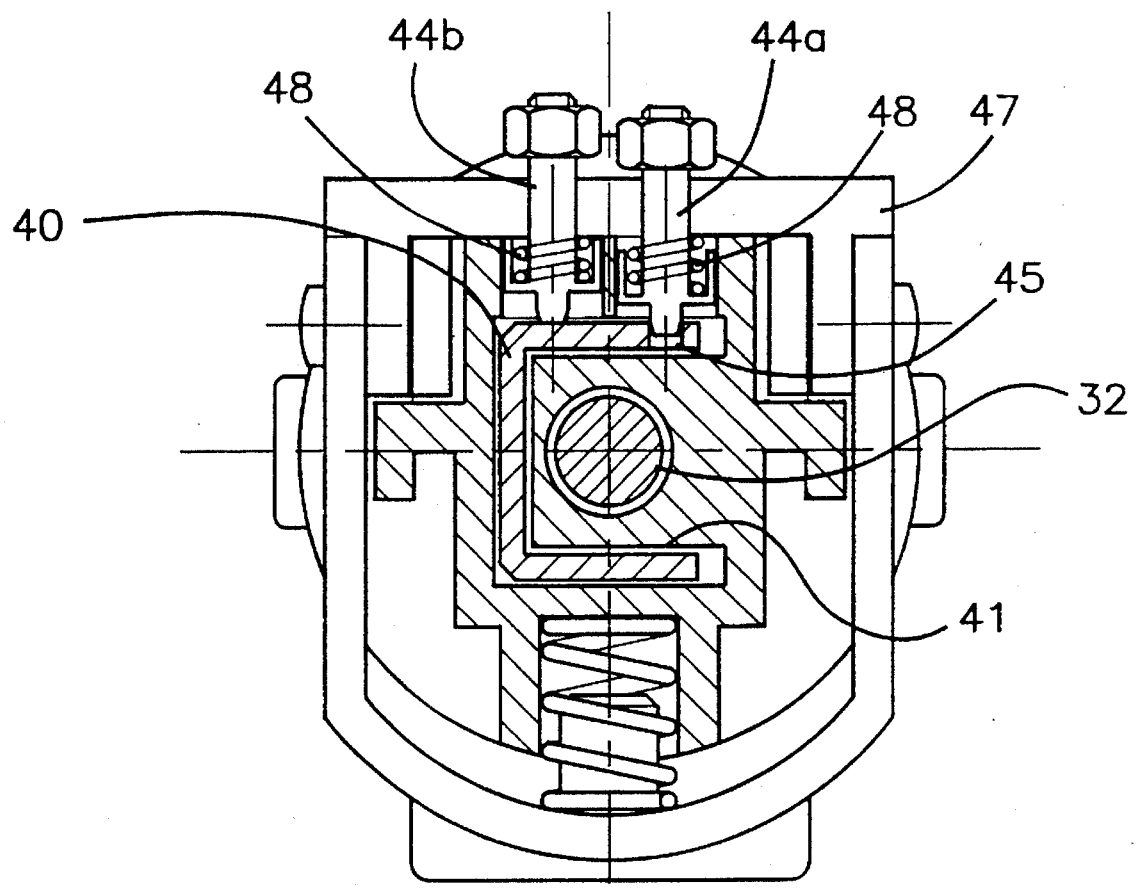

Holes 45 are preferably arranged in two parallel rows 45a, 45b. Pin 44a aligns with row 45a, pin 44b aligns with row 45b. Holes 45 in row 45b are staggered relative to holes 45 in row 45a. This allows the position of stop 36 to be adjusted in increments L equal to one half of the spacing between adjacent holes 45 in either of rows 45a or 45b. As shown in FIG. 9, At each stop position, one of pins 44a or 44b is engaged in a hole 45.

A lock bar 46 is connected to pins 44a, 44b by a linkage 47. When lock bar 46 is pushed inwardly, linkage 47 slides pins 44a, 44b rearwardly, against the force of springs 48, and out of engagement with holes 45. Stop support member 40 is then free to slide up or down relative to cylinder 26. Markings 49 may be provided on stop support member 40 so that an operator of dispenser 20 can quickly ascertain the state of the coarse adjustment.

The spacing of holes 45 in rows 45a and 45b may, for example, be such that the distance between two adjacent holes 45 is the same as the distance that piston 30 must move in cylinder 26 to displace one sixteenth of a fluid ounce. In this case, the movement of support arm 40 between two adjacent locking positions will be one half of this distance, corresponding to a displacement of one thirty-second of a fluid ounce by piston 30.

It is not practical to make holes 45 too close together. If holes 45 and pins 44a, 44b are too small then it is difficult to make dispenser 20 rugged. Therefore, for a given diameter of piston 30, there is a practical lower limit to the size of the increments in which the volume of paint colorant dispensed by dispenser 20 can be adjusted with the coarse adjustment mechanism described above.

Other equivalent coarse adjustment mechanisms which involve a member pivoting or sliding into engagement with spaced holes or indentations in a stop support member have similar limitations.

Figure 3:
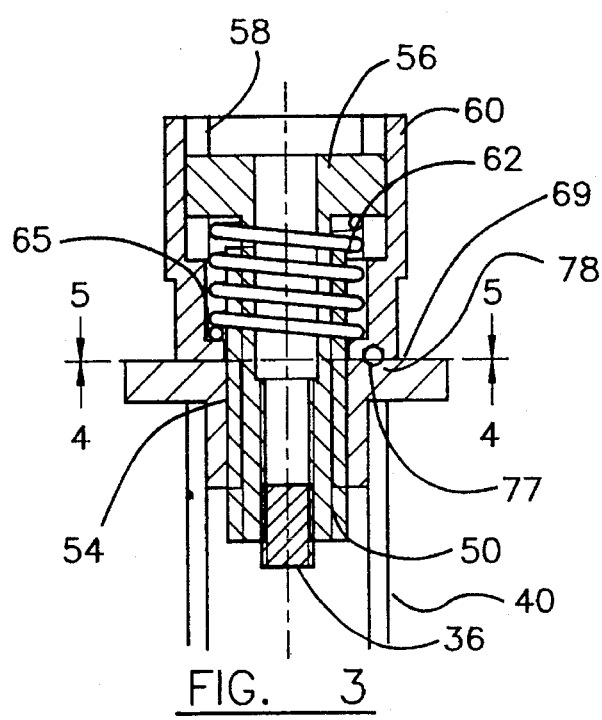
FIG. 3 is a section along the line 3—3 of FIG. 2.
Figure 8:
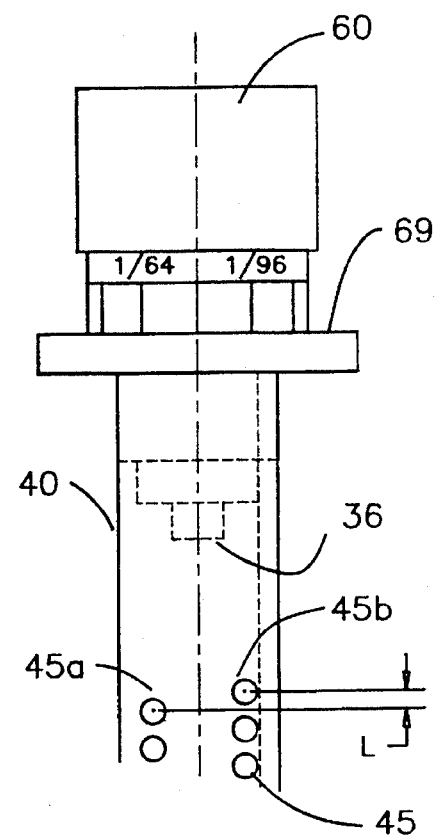
FIG. 8 is a detail of a stop mounting arm from the paint colorant dispenser of FIG. 1; and, FIG. 9 is a section along the line 9—9 through the locking mechanism of the paint colorant dispenser shown in FIG. 6.

Accordingly, the invention provides for fine adjustment of the position of stop 36 by means of stop assembly 38. As shown in FIG. 3, stop 36 is one end of a rod 50. Rod 50 is threaded and passes through a mounting portion affixed to the upper end of stop support member 40. The mounting portion comprises a threaded aperture 54. Rod 50 projects through aperture 54 with stop 36 inside channel 41 on stop support member 40. The position of stop 36 can therefore be adjusted by turning rod 50 with respect to aperture 54. The pitch of the threads on rod 50 and aperture 54 are such that one full 360 degree rotation of rod 50 in aperture 54 causes rod 50 to move axially by at least the distance L which is the distance between adjacent locking positions of support member 40.

Head 56 of rod 50 is housed within a non-circular well 58 inside a knob 60 so that head 56 can slide axially inside knob 60 but cannot turn relative to knob 60. For example, head 56 and well 58 may both be square in section. When knob 60 is turned, rod 50 turns too and head 56 of rod 50 slides axially in well 58.

Knob 60 is retained by spring 62 which bears against the underside of head 56 and against a flange 65 which projects inwardly into well 58. Spring 62 forces knob 60 against a plate 69 which is affixed to support member 40.

Figure 2:
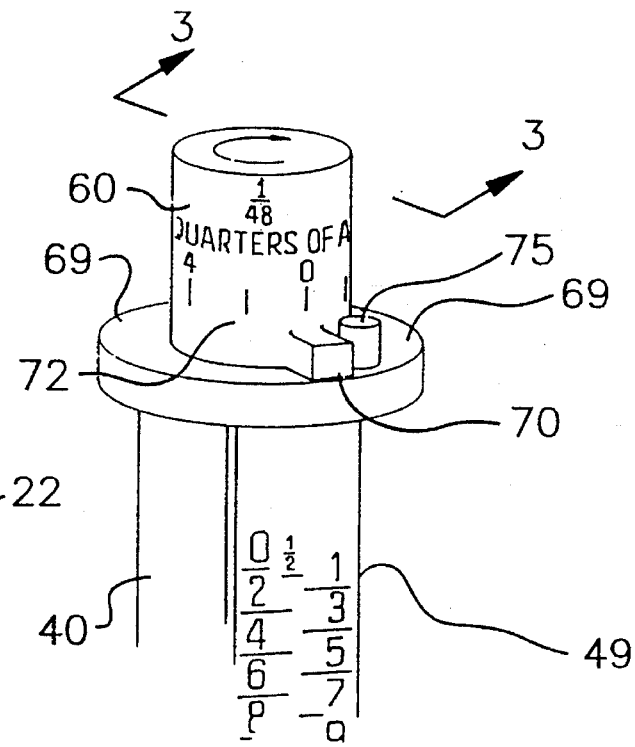
FIG. 2 is a perspective view of an adjustable stop assembly from the paint colorant dispenser of FIG. 1.

Because knob 60 does not move axially with rod 50 with respect to plate 69 position indicating indicia such as marks 72 on knob 60 (FIG. 2) do not move toward or away from plate 69 as knob 60 turns. Consequently, the angle of rotation of rod 50 can be easily read by comparing the position of marks 72 to pin 75. As a less preferred alternative, the position of rod 50 can be read by comparing the position of a projection 70 or a mark on knob 60 to indicia (not shown) on plate 69.

If knob 60 were free to rotate through more than one full revolution then some positions of knob 60 would correspond to two positions of stop 36. Consequently, pin 75 is provided on plate 69 and projection 70 is provided on knob 60 to prevent knob 60 from rotating by more than one full turn. Preferably, the pitch of the threads on rod 50 is such that stop 36 moves by the distance L when knob 60 is turned through the full range of motion permitted by pin 75 and projection 70.

Figure 4:
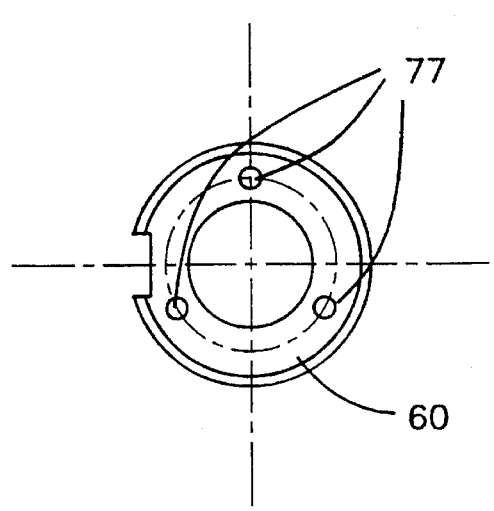
FIG. 4 is a section along the line 4—4 of FIG. 3.
Figure 5:
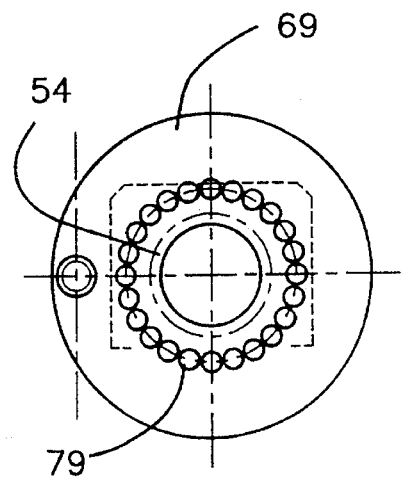
FIG. 5 is a section along the line 5—5 in FIG. 3.

As shown in FIGS. 3, 4 and 5, a detent ball 77 which sits within a hole 78 in knob 60 is provided to facilitate repeatably setting knob 60 in selected intermediate positions corresponding to, for example, ¼, ½, and ¾ of the full rotary range of knob 60. For example, if the distance L in FIG. 6 corresponds to a volume of 1/32 fluid ounce then an adjustment of knob 60 of ¼ of its range would alter the amount of paint colorant dispensed by 1/128 fluid ounce. An adjustment of knob 60 over one half of its range would alter the amount of paint colorant dispensed by 1/64 fluid ounce.

Indentations 79 are provided on the top side of plate 69 for each selected position of knob 60. When knob 60 is in one of the selected positions, detent ball 77 fits into one of indentations 79. As knob 60 is turned to a selected position detent ball 77 snaps into place in one of indentations 79. Knob 60 is then held in the selected position by detent ball 77. When knob 60 is turned away from a selected position, detent ball 77 slightly lifts knob 60 and compresses spring 62. When knob 60 is in a position intermediate two selected positions then detent balls 77 slide smoothly on plate 69. As shown in FIG. 4, several detent balls 77 may be provided spaced apart on the underside of knob 60.

The positions of detent balls 77 and indentations 79 may be reversed so that detent balls 77 lie in recesses 78 on the top side of plate 69 and indentations 79 are on the underside of knob 60. Further, although it is not preferable to do so, detent balls 77 may be replaced with fixed projections which can interfit with indentations 79.

Typically, as shown in FIGS. 6 and 7, measuring cylinder 26 comprises a tube 80 which screws into a threaded socket 81 on the body 28a of valve 28. With this construction, if piston 30 has a flat lower face and piston 30 is fully lowered, piston 30 does not reduce volume 29 to zero. This can be a problem because the accuracy of dispenser 20 may be impaired if air enters volume 29. If volume 29 is not reduced nearly to zero when piston 30 is fully lowered then air which enters volume 29 will not be automatically expelled from volume 29. This problem could affect the accuracy of a dispenser 20 in which small changes made in the travel of a relatively large diameter piston 30 as a result of changes in the position of stop 36 should result in accurately corresponding changes in the amount of paint colorant dispensed.

Preferably, piston 30 has a projecting cushion 85 shaped to conform closely to the shape of the lowermost end of volume 29. When piston 30 is fully lowered, cushion 85 projects past the end of tube 80 and fills up substantially all of the volume between piston 30 and valve 2.8. If any air does enter volume 29 then it is driven out by cushion 85 when piston 30 is fully lowered. Dispenser 20 is calibrated with cushion 85 in place.

Cushion 85 may be formed integrally with piston 30. However, it is generally more cost effective to make cushion 85 from a suitable material such as nylon, and to attach cushion 85 to piston 30 with a screw 88 or any other suitable fastening means.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A paint colorant dispenser comprising: a piston sealingly and slidably mounted in a cylinder having first and second ends and an axis; a stop contacting member on said piston, and apparatus for adjusting the position of a stop for regulating the volume of paint colorant dispensed by the paint colorant dispenser, said apparatus comprising:

a) a stop member comprising a central threaded portion, and a first end having a stop surface, said stop surface axially aligned with said stop contacting member;

b) a stop support member slidably mounted with respect to said cylinder, said stop support member having a mounting portion at one end thereof, said stop member passing through a threaded aperture in said mounting portion, with said threaded portion of said stop member engaged with said threads of said aperture;

c) coarse adjustment means associated with said stop support member for fixing said stop support member in one of a plurality of positions equally spaced apart by a distance L along a line parallel to said axis of said cylinder;

d) a knob associated with said stop member for rotating said stop member in said aperture;

wherein said threads have a pitch such that in one rotation of said stop member, said stop surface moves by a distance of at least L along said line.

2. The paint colorant dispenser of claim 1 wherein said stop member comprises a head having a non-circular section and said head is disposed for sliding without rotation relative to said knob within a non-circular well in said knob.

3. The paint colorant dispenser of claim 2 wherein said head is square in section and said well is square in section.

4. The paint colorant dispenser of claim 2 wherein said knob comprises a flange projecting inwardly into said well and further comprising a compression spring disposed between said flange and a surface of said head for biasing a surface of said knob against a surface of said mounting portion.

5. The paint colorant dispenser of claim 4 further comprising travel limiting means associated with said knob for limiting the range of rotary motion of said knob to no more than one full rotation of said knob.

6. The paint colorant dispenser of claim 5 wherein said travel limiting means comprise a projection from said surface of said mounting portion adjacent said knob and a projection extending radially from said knob.

7. The paint colorant dispenser of claim 6 further comprising indicia on said surface of said mounting portion adjacent said knob at selected positions around said knob for indicating an angle of rotation of said knob.

8. The paint colorant dispenser of claim 7 further comprising detent means for holding said knob in a selected rotary position with respect to said mounting portion.

9. The paint colorant dispenser of claim 8 wherein said detent means comprises a projection from said surface of said mounting portion and an indentation in said surface of said knob.

10. The paint colorant dispenser of claim 9 wherein said projection comprises a ball disposed in a hole in said surface of said mounting portion.

11. The paint colorant dispenser of claim 8 wherein said detent means comprises a projection from said surface of said knob and an indentation in said surface of said mounting portion.

12. The paint colorant dispenser of claim 11 wherein said projection comprises a ball disposed in a hole in said surface of said knob.

13. The paint colorant dispenser of claim 1 wherein said coarse adjustment means comprises a plurality of spaced apart indentations in said support arm and a locking member movable between a first position wherein said locking member is engaged in one of said indentations and a second position wherein said locking member is not engaged in any of said indentations.

14. The paint colorant dispenser of claim 13 wherein said indentations are holes and said locking member comprises a pin, said pin slidably mounted with respect to said cylinder.

15. A paint colorant dispenser comprising:
 a. a cylinder comprising a tube and a valve body closing a lower end of said tube;
 b. a valve in said valve body, said valve having a first position wherein said cylinder is in fluid communication with a reservoir and a second position wherein said cylinder is in fluid communication with an outlet;
 c. a piston slidably and sealingly mounted within said cylinder;
 d. a piston rod connected to said piston, said piston rod comprising a stop contacting surface;
 e. a stop support member slidably mounted with respect to said cylinder,
 f. coarse stop adjustment means for temporarily fixing said stop support member in one of a plurality of positions equally spaced apart by a distance L, said coarse stop adjustment means comprising:
  i. a plurality of indentations in said stop support member;
  ii. a sliding pin selectively engageable in one of said indentations;
  iii. a spring for urging said sliding pin into said one of said indentations; and,
  iv. a linkage associated with said sliding pin for selectively retracting said sliding pin;
 g. fine adjustment means mounted to said stop support member, said fine adjustment means comprising:
  i. a stop mounting plate on said stop support member, said stop mounting plate comprising a threaded aperture axially aligned with said stop contacting surface;
  ii. a stop member comprising a central threaded portion engaged in said threaded aperture, and a lower stop surface;
  iii. a knob on said stop member for turning said stop member in said aperture;
  iv. means for restricting rotation of said stop member and said knob to an angular range, said angular range being no more than one full rotation;
 wherein said threads on said stop member have a pitch such that in rotating said stop member through said angular range, said stop surface moves by a distance of at least L along a line parallel to said axis.

16. The paint colorant dispenser of claim 15 wherein there is space between said lower end of said tube and said valve and, when said piston is at a lowermost position within said cylinder, a portion of said piston projects past said lower end of said tube and occupies substantially all of said space.

17. The paint colorant dispenser of claim 16 wherein said projecting portion of said piston is a plastic cushion affixed to said piston.

18. The paint colorant dispenser of claim 15 wherein said stop member comprises a head having a non-circular section and said head is disposed for sliding without rotation relative to said knob within a non-circular well in said knob.

19. The paint colorant dispenser of claim 18 wherein said knob comprises a flange projecting inwardly into said well and further comprising a compression spring disposed between said flange and a surface of said head for biasing a surface of said knob against a surface of said mounting portion.

20. The paint colorant dispenser of claim 19 wherein said stop support member comprises a longitudinal channel and said stop member projects through said aperture into said channel.

* * * * *